W. J. POROWSKI.
GLASS BEVELING MACHINE.
APPLICATION FILED DEC. 7, 1911.
1,019,520.
Patented Mar. 5, 1912.
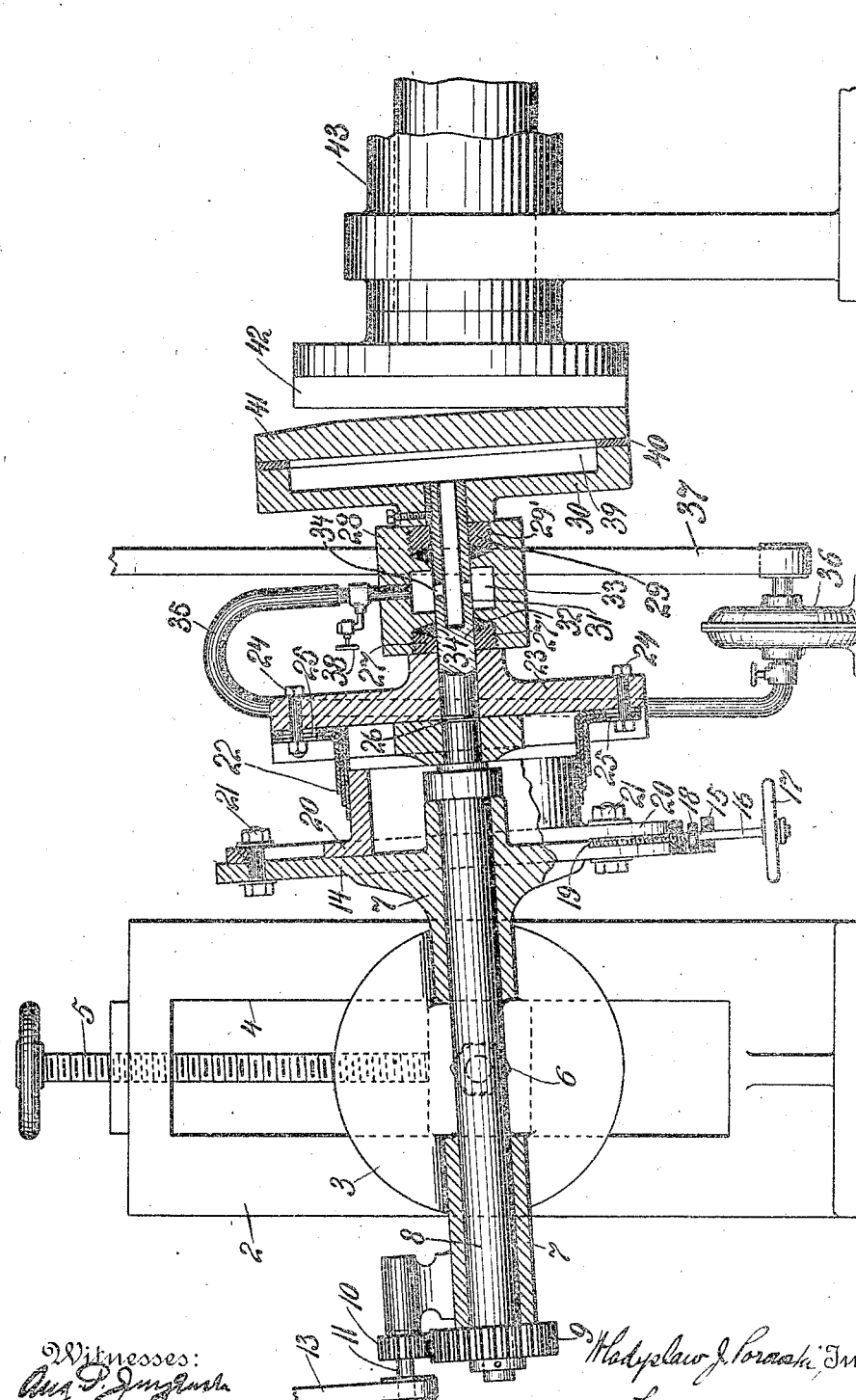

UNITED STATES PATENT OFFICE.

WLADYSLAW J. POROWSKI, OF BROOKLYN, NEW YORK.

GLASS-BEVELING MACHINE.

1,019,520.

Specification of Letters Patent. Patented Mar. 5, 1912.

Application filed December 7, 1911. Serial No. 664,488.

*To all whom it may concern:*

Be it known that I, WLADYSLAW J. POROWSKI, a subject of the Czar of Russia, residing in the borough of Brooklyn, in the county of Kings and State of New York, have invented certain new and useful Improvements in Glass-Beveling Machines, of which the following is a specification, reference being had therein to the accompanying drawing.

My invention relates to improvements in grinding and polishing machines and has particular reference to the class of grinding and polishing machines adapted for grinding, polishing, or otherwise manipulating, beveled glass and the like.

Referring to the accompanying drawings, I have illustrated in side elevation partly in section and with parts broken away, the principal parts of a grinding and polishing machine illustrating an application of my invention.

2 is a standard carrying the disk 3 which may be adjusted within the vertical slot 4 by the hand screw 5 and which may be secured within said slot by the bolt 6 in its adjusted position, and carries the bearing 7 within which is mounted the shaft 8 having at its leftward extremity the gear 9 meshing with the gear 10 upon the shaft 11 provided with the pulley 12 driven by the belt 13 from any suitable source. The bearing 7 terminates in the face plate 14, the lower extremity of which is provided with a projection 15 through which the spindle 16 provided with a hand wheel 17 projects. The spindle 16 is also provided with the projection 18 which may be made integral with the spindle or secured thereto, and below which the spindle is suitably threaded as shown at 19. The threaded portion of the spindle engages the bearing 20 which may be raised and lowered on the face plate 14 by the hand wheel 17 and said bearing 20 may be secured in its adjusted position by any suitable means such as the bolts 21. The bearing 20 carries the connection 22 to which is suitably secured the bearing 23 by suitable means such as the bolts 24. The bearing 23 may be adjusted with reference to the connection 22 by the bolts 24 which slide within the elongated openings 25. The shaft 8 terminates at 26 as shown. From this it will be seen that the bearing 20 can be shifted out of center by the bolts 21 thus converting the rotary motion into elliptical, and the elliptical motion can be further adjusted by the bolts 24. The bearing 23 also preferably terminates in the extremity 27 upon which may be mounted the sleeve 28. The other end of the sleeve 28 is also mounted upon the extremity 29 of the chuck 30.

31 is a hollow tube secured within the bearing 23 and within the sleeve 28 and surrounded by packing such as 32. This bearing is open to the internal chamber 33 of the sleeve 28 through the ports 34 and connected with the chamber 33 is the flexible tube 35 from which air is exhausted from the pump 36 driven by the belt 37 in any suitable manner.

38 is a hand valve communicating with the atmosphere to regulate the amount of vacuum within the chamber 33. The air is extracted from the internal chamber 39 of the chuck 30, and 40 is the rubber gasket or suitably perforated face plate against which the work such as the beveled disk, of glass 41 is retained by the vacuum.

42 is the usual grinding or polishing wheel mounted upon the bearing 43 secured within the standard 44.

From this it will be seen that after the bearing 20 has been adjusted by the bolts 21 and any necessary further adjustment has been made by the bolts 24 and power has been applied through belt 13, the chuck 30 will rotate either upon a center or elliptically and present the surface of the glass or other article 41 to the oppositely rotating wheel 42. It will be further observed that the glass 41 is held to the chuck 30 by the partial vacuum created by exhausting the air from the chamber 39 through the tube 31, ports 34, chamber 33, and tube 35. In this way the glass or any other highly polished object may be held by the chuck without being gripped by jaws, fingers, clips or other devices which can scratch or mar the surface. It will also be understood that any elliptical motion may be imparted or that the chuck will rotate upon a center and that these adjustments can be regulated very accurately.

Of course it will be readily understood that various modifications may be made without departing from the spirit of the invention as set forth in the claims.

I claim—

1. In a grinding or polishing machine, a vertically adjustable support carrying a shaft and a radial adjustable support carrying a second shaft, means for adjusting said second shaft out of alinement with said first mentioned shaft, means for driving said first mentioned shaft, connection therefrom for driving said second shaft while out of alinement therewith, and a chuck carried by said second shaft.

2. In a grinding or polishing machine, a vertically adjustable support carrying a shaft and a radial adjustable support carrying a second shaft, means for adjusting said second shaft out of alinement with said first mentioned shaft, means for driving said first mentioned shaft, connection therefrom for driving said second shaft while out of alinement therewith, and a chuck carried by said second shaft, said chuck being adapted to be exhausted of air and having a hollow spindle, a hollow sleeve around said spindle, and air exhausting apparatus connected to said sleeve.

3. In a grinding machine, a rotatable grinding element, a bracket or support mounted adjacent said grinding element adapted for vertical and radial adjustment, a rotatable shaft carried by said bracket, a stub shaft mounted adjacent said bracket adapted for adjustment out of alinement with the axis of the shaft carried by said bracket, means actuated by the shaft in said bracket adapted to actuate said stub shaft, and a chuck carried by said stub shaft.

4. In a grinding machine, a rotatable grinding element, an independent rotatable shaft mounted adjacent thereto, a guide carried by said shaft, a block slidably mounted in said guide, a stub shaft carried by said guide, means adapted to cause said block to slide to and fro, in said guide, when said stub shaft is rotated, a chuck carried by said stub shaft consisting of a body adapted to receive the object to be ground, said body being provided with a chamber in communication with the rear surface of said object when said object is in position on said chuck, and means adapted to produce a vacuum in said chamber.

In testimony whereof I affix my signature in presence of two witnesses.

WLADYSLAW J. POROWSKI.

Witnesses:
   Louise Enderle,
   Thomas A. Hill.